United States Patent
Velasco et al.

(10) Patent No.: US 8,898,467 B2
(45) Date of Patent: *Nov. 25, 2014

(54) ENABLING/DISABLING DISPLAY DATA CHANNEL ACCESS TO ENABLE/DISABLE HIGH-BANDWIDTH DIGITAL CONTENT PROTECTION

(71) Applicants: Adolfo Velasco, Saddle Brook, NJ (US); Daniel Jackson, Valhalla, NY (US); Yun Mao, Paramus, NJ (US); Dario Pagano, New Providence, NJ (US)

(72) Inventors: Adolfo Velasco, Saddle Brook, NJ (US); Daniel Jackson, Valhalla, NY (US); Yun Mao, Paramus, NJ (US); Dario Pagano, New Providence, NJ (US)

(73) Assignee: CrestronElectronics Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,028

(22) Filed: Jan. 28, 2014

(65) Prior Publication Data

US 2014/0143547 A1    May 22, 2014

Related U.S. Application Data

(63) Continuation of application No. 13/363,310, filed on Jan. 31, 2012, now Pat. No. 8,713,316.

(60) Provisional application No. 61/577,380, filed on Dec. 19, 2011, provisional application No. 61/569,886, filed on Dec. 13, 2011.

(51) Int. Cl.
*H04L 9/00*   (2006.01)
*H04L 9/32*   (2006.01)
*H04L 29/06*  (2006.01)

(52) U.S. Cl.
CPC  *H04L 9/32* (2013.01); *H04L 29/06* (2013.01); *H04L 63/083* (2013.01); *H04L 63/0853* (2013.01); *H04L 63/105* (2013.01); *H04L 63/0435* (2013.01)
USPC .............. 713/168; 713/193; 710/16; 726/11; 348/544; 348/690; 348/705

(58) Field of Classification Search
USPC ............. 713/168, 193; 710/16; 348/544, 690, 348/705; 726/11
See application file for complete search history.

(56) References Cited

U.S. PATENT DOCUMENTS

| 7,398,547 | B2 * | 7/2008 | deCarmo | 726/3 |
| 7,589,734 | B2 * | 9/2009 | Mawatari et al. | 345/501 |
| 2007/0242062 | A1 * | 10/2007 | Guo et al. | 345/204 |
| 2013/0151851 | A1 * | 6/2013 | Velasco et al. | 713/168 |

OTHER PUBLICATIONS

Robert Carter, The nuts and bolts of HDCP, Digital TV Design Line Feb. 20, 2008.

* cited by examiner

*Primary Examiner* — Beemnet Dada
*Assistant Examiner* — Sayed Beheshti Shirazi
(74) *Attorney, Agent, or Firm* — Crestron Electronics Inc.

(57) ABSTRACT

A switcher device comprises a multiplexer coupled in-between at least one input and output cards. The multiplexer detects the presence of an event signal from an activated sink. In response to the detection of the event signal, the switch dynamically switches to a closed position in order to enable the at least one source to authenticate with the input card and the output card to authenticate with the at least one sink for security protocol encryption. In response to the non-detection of the event signal, the switch switches dynamically to an open position in order to disable the at least one source from authenticating with the input card, therefore the output card also does not attempt to authenticate with the at least one sink for security protocol encryption.

36 Claims, 8 Drawing Sheets

ENABLING/DISABLING DISPLAY DATA CHANNEL ACCESS TO ENABLE/DISABLE HIGH-BANDWIDTH DIGITAL CONTENT PROTECTION

BACKGROUND OF THE INVENTION

1. Technical Field

The present invention relates generally to High-Bandwidth Digital Content Protection. More particularly, the invention relates a method, apparatus, and system for enabling and/or disabling Display Data Channel (DDC) access to enable and/or disable High-Bandwidth Digital Content Protection.

2. Background Art

As the digital distribution of television, movies, and music expands, content providers are growing increasingly concerned about the simplicity with which content pirates can copy and share copy protected material. Various digital rights management (DRM) schemes have been developed to ensure that television shows, movies, and music can only be viewed by authorized parties (i.e., paying consumers). The Content Scrambling System (CSS) used to encrypt DVDs and Apple's Fairplay technology are two widely-known examples of DRM schemes. One DRM scheme to protect digital content as it is transmitted over cables between devices is known as High-Bandwidth Digital Content Protection (HDCP). HDCP is a specified method developed by Digital Content Protection, L.L.C., for protecting copyrighted digital content as it travels across connection interfaces and protocols such as DisplayPort (DP), Digital Video Interface (DVI), High-Definition Multimedia Interface (HDMI), Giga-bit Video Interface (GVIF), Digital Light Interface (DLI), Unified Display Interface (UDI), Internet Protocol (IP), Wireless Home Digital Interface (WHDI), Transmission Control Protocol/Internet Protocol (TCP/IP), and Universal Serial Bus (USB). The HDMI specification defines an interface for carrying digital audiovisual content from a source such as a DVD player, to a sink or display device such as a television (TV). As designed by the Digital Content Protection, L.L.C., when the source and sink/display are HDCP compliant, HDCP protected content is displayed but the HDCP protected content cannot be copied and shared. When the source is HDCP compliant and the sink/display is not HDCP compliant, the copy protected material cannot be displayed, copied and/or shared. When the source is HDCP compliant and the sink/display is not HDCP compliant, a non-copy protected material can be displayed, copied and/or shared.

HDCP is designed to prevent copying and sharing of copy protected material. There are issues with interoperability when the material itself is non-copy protected. For example, when an HDCP compliant source such as a laptop is connected to an HDCP compliant sink/display device, non-HDCP protected content cannot, for example, be copied, shared, and replayed at a later time even though the non-HDCP protected content can be displayed on the sink/display device. Many HDCP compliant sources, such as laptops, choose to enable/disable content encryption based on the downstream display's HDCP capabilities. These devices do not "care" if the real-time video content is actually copy protected or non-copy protected and will leave content encryption enabled as soon as the device sees an HDCP compliant sink/display. In the academic field, for example, a university instructor may want students to copy and share content material that is not copy protected (e.g., the professor's PowerPoint presentation). Even though the content is non-copy protected, the students will not be able to copy, replay or share the content because the source and sink/display devices are HDCP compliant.

Accordingly, it is the object of the present invention to correct interoperability issues related to HDCP. The present invention provides a system, apparatus, and method for enabling/disabling Display Data Channel access to enable/disable HDCP.

SUMMARY OF THE INVENTION

It is to be understood that both the general and detailed descriptions that follow are exemplary and explanatory only and are not restrictive of the invention.

DISCLOSURE OF INVENTION

Principles of the invention provide a system, apparatus, and method for enabling/disabling Display Data Channel access to enable/disable a security protocol, such as HDCP. For example, in a first aspect of the invention, a system for enabling/disabling Display Data Channel (DDC) access to enable/disable a security protocol comprises at least one source, at least one sink, and a switcher device communicatively coupled in-between the at least one source and the at least one sink. The switcher device comprises a multiplexer coupled in-between at least one input and output cards and configured to transmit an audiovisual signal from the at least one input card to a first and at least a second output card via a physical connection. The multiplexer is configured to dynamically switch between the first and at least second output card based on a user control signal that activates one of the at least one sinks. Each of the output cards is coupled to the at least one sink. The input card comprises an integrated circuit that includes a security protocol enabled receiver and a switch coupled in-between the security protocol enabled receiver and an Extended Display Identification Data (EDID) memory. The input card is configured to detect the presence of an event signal from at least one user interfaced device. In response to the detection of the event signal, the switch dynamically switches to a closed position in order to enable the at least one source to authenticate with the input card and the output card to authenticate with the at least one sink for security protocol encryption. In response to the non-detection of the event signal, the switch switches dynamically to an open position in order to disable the at least one source from authenticating with the input card, therefore the output card also does not attempt to authenticate with the at least one sink for security protocol encryption.

In a second aspect of the invention, a switcher device comprises a multiplexer coupled in-between at least one input and output cards and configured to transmit an audiovisual data signal from the at least one input card to a first and at least a second output card. The multiplexer is configured to dynamically switch between the first and at least second output card based on a user control signal that activates one of at least one sinks. Each of the output cards is coupled to the at least one sink. The input card comprises an integrated circuit that includes a High-Bandwidth Digital Content Protection (HDCP) enabled receiver and a switch coupled in-between the HDCP enabled receiver and an Extended Display Identification Data (EDID) memory. The at least one input card is configured to detect the presence of an event signal from the at least one user interface device. In response to the detection of the event signal, the switch is configured to dynamically switch to a closed position in order to enable the at least one source configured to authenticate with the input card and the output card configured to authenticate with the at least one sink for security protocol encryption. In response to the non-detection of the event signal, the switch is configured to dynamically switch to an open position in order to disable the at least one source from initiating an authentication with the input card, therefore the output card also does not attempt to initiate an authentication with the at least one sink for security protocol encryption.

In a third aspect of the invention, a method for enabling/disabling Display Data Channel (DDC) access to enable/disable High-Bandwidth Digital Content Protection comprises detecting a user control signal to activate one of at least one sinks. The method further comprises in response to the detection of the user control signal, enabling the selected at least one sink for receiving audiovisual signal and detecting an event signal. In response to the detection of the event signal, switching the switch dynamically to a closed position for enabling the at least one source to authenticate with the input card and enabling the output card to authenticate with the at least one sink for security protocol encryption. The method further comprises permitting the transmission of audiovisual signal from the at least one source to the enabled at least one sink upon successful authentication and disabling control of the enabled at least one sink from being able to record since the audiovisual signal contains copy protected content. In response to the non-detection of the event signal, switching the switch dynamically to an open position in order to disable the at least one source from initiating an authentication with the input card, therefore the output card also does not attempt to initiate an authentication with the at least one sink for security protocol encryption. The method further comprises permitting the transmission of the audiovisual signal to be displayed from the at least one source to the enabled at least one sink, and enabling control of the enabled at least one sink from being able to be recorded since the audiovisual signal contains non-copy protected content.

In a fourth aspect of the invention, an integrated circuit comprises an enabled High-Bandwidth Digital Content Protection (HDCP) receiver, an Extended Display Identification Data (EDID) memory, and a switch coupled in-between the security protocol enabled receiver and the EDID memory. The integrated circuit is configured to detect the presence of an event signal from at least one user interface device. In response to the detection of the event signal, the switch is configured to dynamically switch to a closed position in order to enable the at least one source configured to authenticate with the input card and the output card configured to authenticate with the at least one sink for security protocol encryption. In response to the non-detection of the event signal, the switch is configured to dynamically switch to an open position in order to disable the at least one source from initiating an authentication with the input card, therefore the output card also does not attempt to initiate an authentication with the at least one sink for security protocol encryption.

In a fifth aspect of the invention, a computer program product for enabling and disabling a security protocol, the computer program product comprises a computer readable storage medium having computer readable program code embodied therewith. The computer readable program code comprises computer readable program code configured to: detect a user control signal to activate one of at least one sinks; in response to the detection of the user control signal, enabling the selected at least one sink for receiving audiovisual signal; detect an event signal; wherein in response to the detection of the event signal, switching the switcher dynamically to a closed position for enabling the at least one source to authenticate with the input card and enabling the output card to authenticate with the at least one sink for security protocol encryption; permit the transmission of audiovisual signal from the at least one source to the enabled at least one sink upon successful authentication; and disable control of the enabled at least one sink from being able to be recorded since the audiovisual signal contains copy protected content; wherein in response to the non-detection of the event signal, switch the switch dynamically to an open position in order to disable the at least one source from initiating an authentication with the input card, therefore the output card also does not attempt to initiate an authentication with the at least one sink for security protocol encryption; permit the transmission of the audiovisual signal to be displayed from the at least one source to the enabled at least one sink; and enable control of the enabled at least one sink from being able to record since the audiovisual signal contains non-copy protected content.

The present invention seeks to overcome or at least ameliorate one or more of several problems, including but not limited to: the ability to view, copy, and share non-copy protected content on source and sink/display devices that are HDCP compliant.

Figure 1:
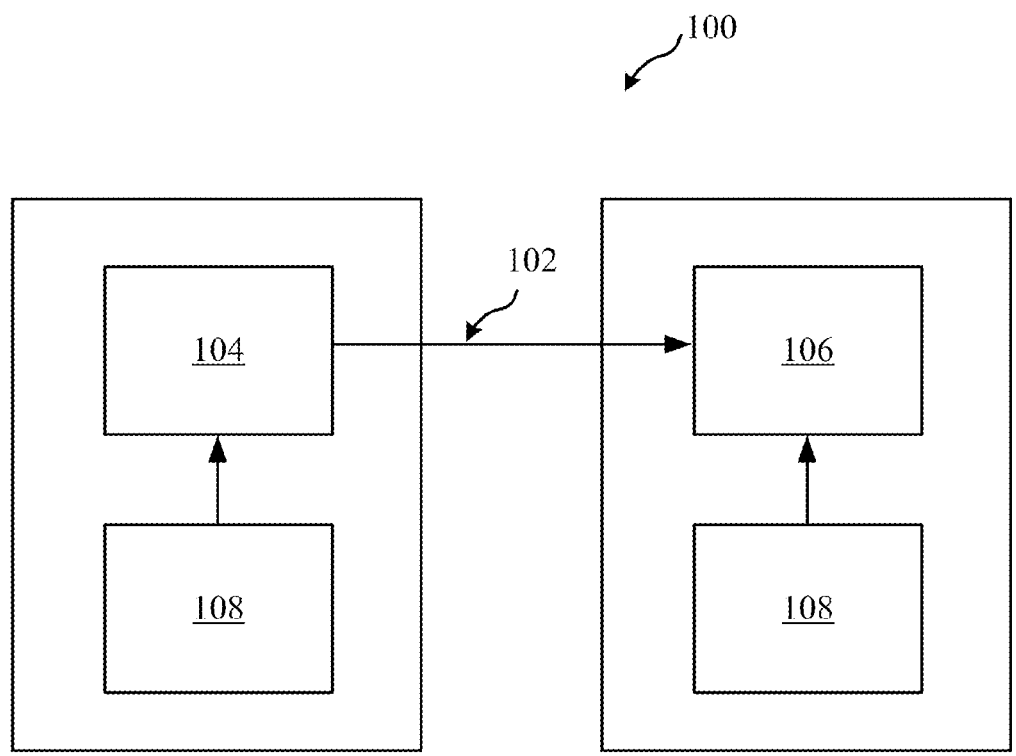
FIG. 1 is a schematic of a system in accordance with an illustrative embodiment of the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

LIST OF REFERENCE NUMBERS FOR THE MAJOR ELEMENTS IN THE DRAWING

The following is a list of the major elements in the drawings in numerical order.
  100 High-Bandwidth Digital Content Protection system
  102 Collectively interface cable, link or physical connection of 102a, 102b
  104 Collectively the source of 104a, 104b, . . . , 104n
  106 Collectively the sink/display of 106a, 106b, . . . , 106n
  108 Secret device keys
  200 High-Bandwidth Digital Content Protection system
  202 HDCP content or audiovisual data
  210 Control function
  212, 215 HDCP transmitter
  214, 216, 514, 614, 714 HDCP receiver
  219 Repeater 220 Central Processing Unit
300 System for enabling and disabling DDC
302 Switcher
304 Event signal
306 Multiplexer
308 Collectively the input card of 308a, 308b, . . . , 308n
310 Collectively the output card of 310a, 310b, 310n
316 User control signal
318 Processing unit
320 Transceiver
322 Control system
323 User interface device, specifically wireless/mobile device
324 User interface device
326, 526, 626, 726 Integrated circuit
328 Software Tools
330 Extended Display Identification Data
332, 532, 632 Switch
508, 608, 708 Input card
530 Internal EDID
535 External EDID
630, 730 EDID
800 Method for enabling/disabling DDC
805 Step—starts
810 Step of detecting a user control signal
815 Step of enabling the activated at least one sink
820 Step of detecting an event signal
825 Step of dynamically switching to an open position
830 Step of permitting the transmission of AV signal
835 Step of enabling the AV signal from being able to be recorded and shared
850 Step of dynamically switching to a closed position
855 Step of permitting the transmission of audiovisual signal to be viewed
860 Step of disabling the audiovisual signal from being able to be recorded and shared

DETAILED DESCRIPTION OF THE INVENTION

Mode(s) for Carrying Out the Invention

Disclosure of Invention

Definitions

Authorized device—An HDCP device that is permitted access to HDCP content. An HDCP transmitter may test if an attached HDCP receiver is an authorized device by successfully completing the first and, when applicable, second part of the authentication protocol. If the authentication protocol successfully results in establishing authentication, then the other device is considered by the HDCP transmitter to be an authorized device.

Downstream—Used as an adjective to refer to being towards the sink/display of the HDCP content stream.

DVI—Digital Video (or Visual) Interface, a digital interface standard created by the Digital Display Working Group (DDWG) to accommodate both analog and digital monitors.

Event Signal—A signal that includes, but not limited to, activating a particular mode of a source.

HDCP—High-Bandwidth Digital Content Protection.

HDCP content—Audiovisual content that is protected by the HDCP system. HDCP content includes the audiovisual content in encrypted form as it is transferred from an HDCP transmitter to an HDCP receiver over an HDCP-protected Interface.

HDCP device—Any device that contains one or more HDCP-protected interface ports and is designed in adherence to HDCP.

HDCP Encryption—The encryption technology of HDCP when applied to the protection of HDCP content in an HDCP system.

HDCP-protected Interface—An interface for which HDCP applies.

HDCP-protected Interface Port—A connection point on an HDCP Device that supports an HDCP-protected Interface.

HDCP receiver—An HDCP device that can receive and decrypt HDCP content through one or more of its HDCP-protected interface ports.

HDCP repeater—An HDCP device that can receive and decrypt HDCP content through one or more of its HDCP-protected interface ports, and can also re-encrypt and emit the HDCP content through one or more of its HDCP-protected interface ports. An HDCP repeater may also be referred to as either an HDCP receiver or an HDCP transmitter when referring to either the upstream side or the downstream side, respectively.

HDCP transmitter—An HDCP device that can encrypt and emit HDCP content through one or more of its HDCP-protected interface ports.

HDMI—Short for High-Definition Multimedia Interface, an industry-supported, uncompressed, all-digital audio/video interface.

Mode—The mode of the source includes, but not limited to, playing a blu-ray DVD, displaying a PowerPoint presentation, displaying a website, collaborating on a white board application, using a document camera, and streaming content from a media player.

Upstream—Term used as an adjective to refer to being towards the source of the HDCP content stream. The antonym of "downstream," defined above.

Figure 2:
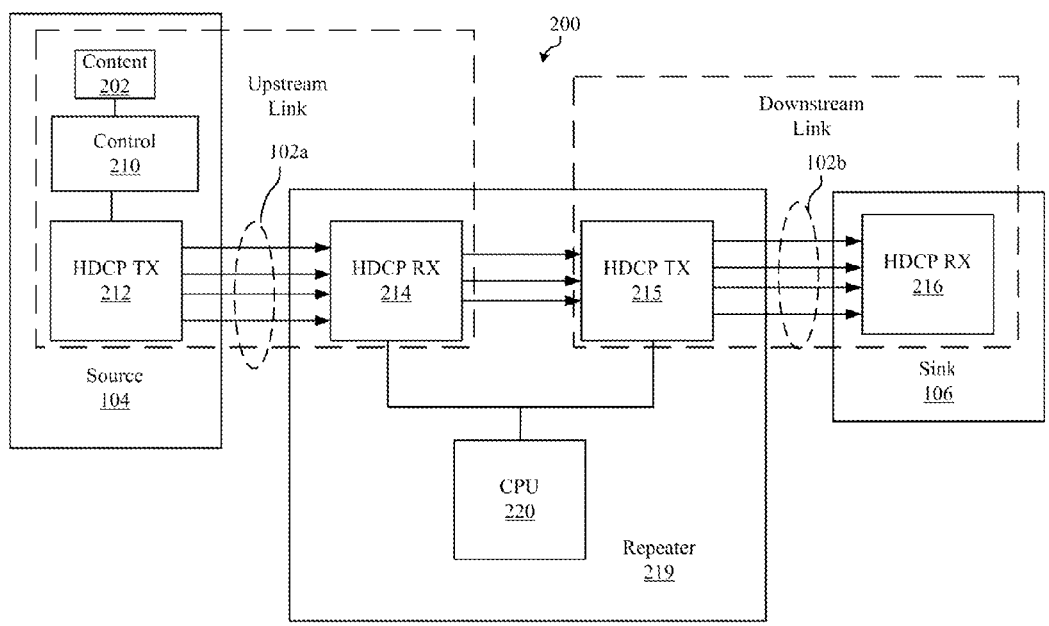
FIG. 2 is a schematic of a system in accordance with an illustrative embodiment of the present invention.

FIGS. 1 and 2 illustrate examples of High-Bandwidth Digital Content Protection (HDCP) systems 100, 200. Referring to FIG. 1, the HDCP system 100 encrypts the digital content transmission between a video source 104 (set-top box, computer, DVD, etc.) and a sink or display 106 (Liquid Crystal Display, television, etc.) via an interface 102 such as Digital Video Interface (DVI), High-Definition Multimedia Interface (HDMI), and DisplayPort.

FIG. 2 illustrates an HDCP system 200 wherein two or more HDCP devices 104, 106 are interconnected through at least one interface 102a, 102b (collectively 102) such as HDCP-protected interface. A single point-to-point HDCP link can involve one HDCP transmitter 212, and one HDCP receiver 214. As such, a repeater 219 must decrypt the HDCP content 202 at the HDCP receiver 214 on each of its inputs. The repeater 219 must then re-encrypt the data with an HDCP transmitter 215 of each of its outputs. The repeater 219 must inform the upstream device of its downstream connection, but it is the repeater's 219 responsibility to maintain those connections. The audiovisual content protected by HDCP, HDCP content 202, flows from an upstream content control function 210 into the HDCP system 200 at the most upstream transmitter 212. From there, the HDCP content 202, encrypted by the HDCP system 200, flows through a tree-shaped topology of HDCP receivers 214 over HDCP-protected interfaces 102a. HDCP receivers 214 may be HDCP repeaters 219 that serve as downstream HDCP transmitters 215 emitting the HDCP content 202 further downstream to one or more additional HDCP receivers 216. The system 200 is meant to stop HDCP-encrypted content from being played on devices that do not support HDCP or which have been modified to copy HDCP content 202. Before sending data, the each transmitter 212, 215 checks that the HDCP receivers 214, 216 are authorized to receive the HDCP content 202. If so, the transmitter 212 encrypts the HDCP content 202 to prevent eavesdropping as it flows to the receiver 216. A central processing unit 220 includes firmware to process the data 202 and other information and control. The HDCP receiver 216 may incorporate a lecture system that permits non-copy protected content to be recorded. For example, such a lecture system may be a CAPTURELIVEHD system available from Crestron Electronics, Inc. of Rockleigh, N.J. The system enables a simple and efficient end-to-end solution for recording, scheduling, processing, online distribution, and remote viewing of lecture and presentation content. The recorded lecture system may include content and microphone audio, plus full screen, picture-in-picture (PIP) and picture-by-picture video, including from the instructor camera and any other presentation source such as a PowerPoint®, DVD or website. In another embodiment, the lecture system may be a separate system that connects to the receiver 216 and the sink 106.

There are three facets of the content protection system. First, there is the authentication protocol, through which the HDCP transmitter 212 verifies that a given HDCP receiver 216 is licensed to receive HDCP content 202. Second, the legitimacy of the HDCP receiver 216 determined, encrypted HDCP content 202 is transmitted between the two devices 104, 106 based on shared secrets established during the authentication protocol. The use of such shared secrets prevents eavesdropping devices from utilizing the content. Finally, in the event that legitimate devices are compromised to permit unauthorized use of HDCP content 202, renewability allows an HDCP transmitter 212 to identify such compromised devices and prevent the transmission of HDCP content 202.

The HDCP authentication protocol is an exchange between an HDCP transmitter 212 and an HDCP receiver 216 that affirms to the HDCP transmitter 212 that the HDCP receiver 214 is authorized to receive HDCP content 202. That affirmation is in the form of the HDCP receiver 216 demonstrating knowledge of a set of secret device keys 108 (FIG. 1). Each HDCP device is provided with a unique set of secret device keys, referred to as the Device Private Keys, from Digital Content Protection, LLC. (DCP). The communication exchange, which allows for the receiver 216 to demonstrate knowledge of such secret device keys 108, also provides for both HDCP devices 104, 106 to generate a shared secret value that cannot be determined by eavesdropping on that exchange. By having that shared secret information embedded into the demonstration of authorization, the shared secret can then be used as a symmetric key to encrypt HDCP content 202 intended only for the authorized device. Thus, a communication path is established between the HDCP transmitter 212 and HDCP receiver 216 that only authorized devices can access.

Device manufacturers typically purchase HDCP chips from a DCP-licensed silicon vendor. These chips usually also provide Transition Minimized Differential Signaling (TMDS) encoders or decoders and other HDMI-specific features. Every transmitter 212 will have at least one HDCP transmitter chip and every receiver 216 will have at least one HDCP receiver chip. The HDCP transmitters 212, and receivers 216 frequently require a microprocessor to implement the authentication state machines. Transmitters 212, 215 are HDMI transmitters.

To support HDCP, each transmitter 212 and receiver 216 must possess the following elements:

Keys: Each HDCP transmitter 212, 215 and receiver 214, 216 has forty unique 56-bit private keys. These keys are provided by DCP to licensed HDCP chip vendors, who pre-load the keys onto the chips before selling them to device manufacturers. These keys must never leave the chip and may not be read by any other device.

KSVs: Each HDCP chip also has a public 40-bit value known as the Key Selection Vector (KSV). Each KSV consists of twenty binary 1s and twenty binary 0s. The KSVs and keys of all licensed HDCP devices are mathematically related according to a cryptographic key exchange protocol similar to Blom's scheme. In this scheme, any two licensed devices can swap KSVs and use them, along with their private keys, to come up with a shared secret key. This shared key can be used to encrypt and decrypt the TMDS stream. The KSV can also be used to uniquely identify a transmitter or receiver.

HDCP cipher: Each chip must implement the HDCP cipher. The cipher accepts a seed value and uses it to generate a deterministic pseudo-random stream of data. All HDCP cipher implementations should generate the same output stream given the same seed value. This publicly defined cipher is used during both authentication and encryption.

Registers: Each HDCP receiver 214, 216 provides a series of pre-defined Digital Display Channel (DDC) accessible registers. All of the HDCP communications between the source 104 and sink/display 106 occurs by the source 104 reading from and writing to these registers.

The Authentication and Encryption Protocols

HDCP authentication consists of three parts:

Part 1: The source 104 authenticates with the sink/display 106 connected to its output. If successful, encryption is enabled and audiovisual (A/V) content transmission begins.

Part 2: This part is used if the downstream device is a repeater 219. The repeater 219 authenticates with the devices connected to its output(s) and passes the HDCP tree topology information up to the source 104. The source 104 is the root and sinks/displays 106 are the leaves, while repeaters 219 make up the branches of the tree.

Part 3: The source 104 performs periodic checks with the sink/display 106 to ensure that encryption is in sync. HDCP also supports a key revocation mechanism that is designed to prevent content from being transmitted to known hacked devices. If any part of authentication fails or any revoked devices are found in the HDCP tree, the transmitter 212 must stop sending protected content and authentication starts over at Part 1. Authentication, encryption, and revocation are described in detail in the following sections.

Authentication Part 1

Part 1 of authentication is a key exchange protocol. The transmitter 212 and receiver 216 calculate a common secret session key 108 to be used for encryption. If they cannot come up with the same key value, authentication fails and the receiver 216 will not be able to decrypt the content 202. The session key 108 is derived from each device's private key according to the following protocol:

First the transmitter 212 generates a random number "An" and sends it to the receiver 216. This value will be used later in the protocol. The devices 104, 106 then exchange KSVs. The receiver 216 also sends its REPEATER bit, a flag that indicates whether or not it is part of a repeater. Now each device 104, 106 has the other device's Key Selection Vector (KSV). Each device 104, 106 uses the other device's Key Selection Vector to select twenty of its own keys. The forty bits in the KSV correspond to the indexes of each of the forty private keys. For every set bit in the received KSV, the local private key at that index is selected. All KSVs have twenty set bits, so twenty keys are selected. The devices 104, 106 then each add up their selected keys to come up with the sums Km and Km', for the transmitter and receiver, respectively 212, 216. For authentication to succeed, Km and Km' must match. Each device 104, 106 tells the other which of its own unique, secret keys to select, and they both come up with the same sum. That may seem counter-intuitive, but it is the aforementioned mathematical relationship between the keys and the KSVs that accounts for this behavior. The source 104 must determine whether Km and Km' match. However, they are secret values, so they cannot be transmitted over the interface cable or physical connection 102 for the DDC. Each device 104,106 feeds Km (or Km'), the random number "An", and the REPEATER bit into their respective HDCP cipher engines in order for the transmitter 212 to verify that the values match without sending them across the cable 102 for everyone to see. The resulting data stream is split into three values:

R0/R0': This return value may be shared between the devices 104, 106 and is used to verify that authentication was successful.

Ks/Ks': This value is kept private and is used as the encryption session key for the HDCP cipher.

M0/M: This value is also kept private and is used in Part 2 of authentication (if the downstream device is a repeater 219).

The receiver sends R0' to the transmitter 212, which compares it against its' own R0 value. If they match, that proves that the sums Km and Km' matched, and authentication is successful. Furthermore, the session keys Ks and K match, so the receiver 214 will be able to decrypt the content encrypted by the transmitter. If Part 1 of authentication was successful, the transmitter 212 may begin sending encrypted content 202. If the downstream device is a repeater 219, the repeater 219 must authenticate with its own downstream device according to the same protocol. The transmitter 212 then starts a 5-second timer to allow for the repeater 219 to perform Part 2 of authentication. If Part 2 fails or times out, authentication fails and the transmitter 212 must stop transmitting the protected content 202.

Authentication Part 2

Part 2 of authentication only occurs if the downstream device is a repeater 219. The purpose of Part 2 is to inform the source 104 of all downstream devices and the HDCP tree depth. The source 104 uses this information to ensure that the tree topology maximums have not been exceeded and to ensure that none of the downstream devices have been revoked by DCP. The repeater 219 first assembles a list of the KSVs of all downstream devices, as well as the device count and the tree depth. The repeater 219 then passes this information up to the source 104. To ensure that this information hasn't been tampered with during transmission, each device takes this list, appends its secret value M0/M0' from Part 1, and calculates a SHA-1 hash of the whole thing. The transmitter 212 reads the hash result from the receiver 214 and compares it against its own. If they match, Part 2 of authentication is successful.

Authentication Part 3

All HDCP devices are considered authenticated after successful completion of Authentication Parts 1 and 2. Part 3 is simply a link integrity check to ensure that encryption is in sync between all transmitter/receiver pairs 212, 214, 215, 216 in the tree. To support link integrity checks, the return values Ri and Ri' roll over to a new value every 128 frames. Recall that the initial Ri values R0 and R0' were generated during Part 1 of authentication. Every two seconds, the transmitter 212 compares the receiver's 216 Ri' value against its own Ri value to see if they match. If they do not, encryption is out of sync and the receiver 216 cannot correctly decrypt the content 202. The user will see a scrambled or "snowy" image on the screen. In this case the transmitter 212 must restart authentication from the beginning.

Encryption

The transmitter 212 uses the HDCP cipher engine to encrypt the content 202. The session key Ks from Authentication Part 1 is used as the seed value, and the cipher output stream is simply XORed with the audiovisual content. The transmitter 212 then sends the XOR output to the receiver 216 as the encrypted data stream. To decrypt the data, the HDCP receiver 214 seeds its own cipher engine with its matching value Ks'. Since Ks equals Ks', the cipher output matches that of the transmitter 212. The receiver 216 then XORs its cipher output stream with the encrypted data, and the output is the decrypted audiovisual content 202.

Revocation

The HDCP designers recognized that despite their best efforts, private device keys could possibly be compromised. If such a compromise were discovered, the designers wanted a method by which they could prevent content from being sent to the compromised units. To this end, HDCP sources 104 are required to manage System Renewability Messages (SRMs). SRMs carry a list of revoked KSVs that may be provided with the audiovisual content. For instance, a SRM could be stored on an HD-DVD or may be transmitted with a cable television signal. If presented with an SRM, the HDCP source must check all the downstream KSVs obtained during Parts 1 and 2 against the KSVs listed in the SRM. If there are any matches, the HDCP source must stop transmitting the protected content. SRMs are only supported by the HDCP source 104; neither repeaters 219 nor sink/displays 106 handle SRMs.

HDCP eliminates the possibility of intercepting digital data midstream between the source 104 to the sink/display 106 because of the authentication process as described above. However, in some situation when the source 104 and the sink/display 106 are HDCP compliant, non-HDCP content cannot be recorded and shared. This is an issue, for example, in a university setting where instructors want students to have the ability to copy and share non-HDCP content. More specifically, the use of laptops during a university lecture by instructors and students has become common, particularly when wireless networks allow free campus internet access. The instructors may show a PowerPoint presentation of the lecture and want students to view, record, and/or copy the presentation. Additionally, some university professors are aware of the needs of disabled students who require laptops to take notes and/or copy the presentation.

With HDCP compliant source 104 and sink/display 106 devices, students will not be able to copy and/or record presentation. As will be explained below, the present invention discloses system, apparatus and method for allowing the non-copy protected content to be recorded and/or shared when the source 104 (that is HDCP compliant) and a sink/display 106 (that is HDCP compliant or not). The present invention discloses that the source 104 does not recognize the sink/display 106 to be HDCP compliant when the sink/display 106 itself is HDCP compliant. As a result, the authentication process never occurs and hence failure of authentication is not possible. The HDCP compliant source 104 proceeds to transmit the non-HDCP content to the HDCP compliant sink/display 106 even though the sink/display 166 is HDCP compliant.

Figure 3:
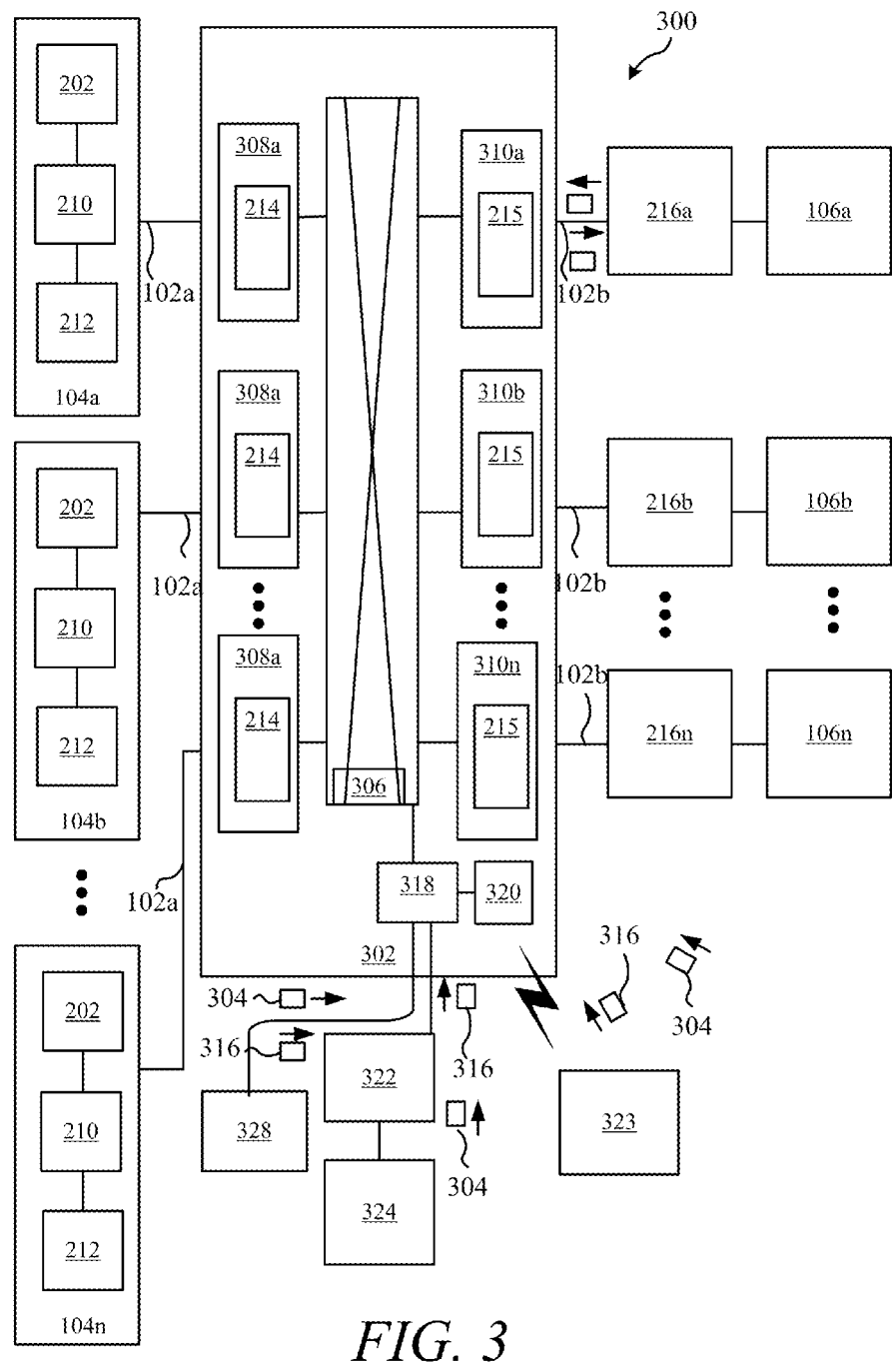
FIG. 3 is a schematic of system in accordance with an illustrative embodiment of the present invention.

FIG. 3 is a system 300 for enabling and disabling a DDC access to enable/disable a security protocol such as HDCP between a source 104 (that is HDCP compliant) and sink/display 106 (that is HDCP compliant). The owner of the non-copy protected content may use the system 300 to enable or disable the DDC at the source 104 (that is HDCP compliant) and transmit the non-copy protected content to the sink/display 106 (that is HDCP compliant or not). Thereby, enabling the viewers such as university students to be able to record and/or copy the lecture. The system 300 includes at least one source 104a, 104b, . . . , 104n (collectively 104) and at least one sink or display 106a, 106b, . . . , 106n (collectively 106). Each source 104 includes an HDCP supported HDMI transmitter 212 configured to transmit audiovisual data to the at least one sink 106. Each source 104 further includes a graphic generator (not shown) to generate the graphic or image. The HDCP transmitter 212 receives the HDCP content 202 from an upstream content control function 210.

Some sinks/displays 106a may include an HDCP compliant receiver. Other sinks/displays 106b may not include an HDCP compliant receiver. The source 104 determines via the authentication process what content can be viewed, recorded, and shared based on sinks/displays 106 that support HDCP and sinks/displays 106 that do not support HDCP. The output of the source 104 is connected to an input of a switcher device 302 through its HDCP-protected interfaces. It should be understood that the switcher device 302 could be any device or apparatus that is capable of enabling, connecting, disabling, disconnecting an I2C signal used in DDC communication such as a relay, FET switch, I2C buffer, mux, and digital logic.

The output of the switcher device 302 is connected to the input of the sink/display 106 via another interface 102b. The interface 102a, 102b for the input and the output of the switcher device 302 may be an HDMI cable that carries a variety of signals such as Transition Minimized Differential Signaling (TMDS), Digital Display Channel (DDC), Hot Plug Detect (HPD), and 5-volt.

When an HDCP source 104 (more specifically source 104a) detects an HPD signal from an HDCP compliant sink/display 106 (more specifically sink/display 106a), the source 104a will transmit the HDCP content 202 to the sink/display 106a after the authentication process is successful.

The audiovisual data 202 is encoded into three data channels. These channels and a TMDS clock are carried over four differential pairs from the source 104 to the sink/display 106. The DDC is a communications interface similar to I2C. This interface provides two-way communication in a master-slave relationship. The upstream device 104 is the DDC master and the downstream device 106 is the DDC slave. The sink/display 106 indicates its presence to the source 104 with the HPD signal. The sink/display 106 can toggle the HPD signal to reset the HDMI connection (and thus, the HDCP session). Though not specifically defined by HDMI, many devices support a feature known as RxSense. There is no RxSense wire, but rather, sources 104 can detect that a sink/display 106 has terminated the TMDS differential pairs. Similarly to HPD, this signal can be used to detect the presence of a sink/display 106. The HDCP transmitter 212 is the HDCP Device most upstream, and receives the HDCP content 202 from an upstream content control function 210.

The switcher device 302 is a fully modular and expandable matrix switcher offering low-latency digital video and audio switching, and HD lossless multi-room signal distribution, for all types of A/V sources. The switcher device 302 may be a CRESTRON DIGITAL MEDIA SWITCHER available from Crestron Electronics, Inc. of Rockleigh, N.J. The CRESTRON DIGITAL MEDIA SWITCHER is a field-configurable to handle, but not limited to, 8, 16, or 32 audiovisual sources of virtually any type. The outputs are also field-configurable to provide, but not limited to, 8, 16, or 32 room outputs and/or HDMI outputs in a single chassis. The switcher device 302 includes a multiplexer 306 coupled in-between the at least one input card 308a, 308b, 308n (collectively 308) and at least one output card 310a, 310b, 310n (collectively 310).

The multiplexer 306 transmits an audiovisual data signal 202 from the at least one input card 308 to a first and at least a second output card 310. The multiplexer 306 dynamically switches between the first and at least second output cards 310a, 310b based on a user control signal 316 that activates one of the at least one sinks/displays 106. Each of the output cards 310 is coupled to the at least one sink/display 106 via interface cable/physical connection 102b. The switcher 302 further includes a processing unit 318 coupled to the multiplexer 306. The processing unit 318 includes at least one transceiver 320 for bidirectional communications with user interface devices (e.g., 323, 324), in part, to receive the user control signal 316 and event signal 314. The user interface device 323, 324 transmits the user control signal 316 from a touch panel display 324 via a control system 322. An end user may also transmit the user control signal 316 from a wireless device 323. Software tools 328 may be loaded onto the wireless device and/or touch panel 324 to assist the end user in selecting a desired sink/display 106. In response to the user activating the desired sink or display 106, the end user device transmits the user control signal 316 to the switcher 302. A user interface device 324 may be a display device such as, but not limited to, a graphical user interface (GUI) touch panel, mobile device 323, tablet, projector, desktop computer, and laptop.

Figure 4:
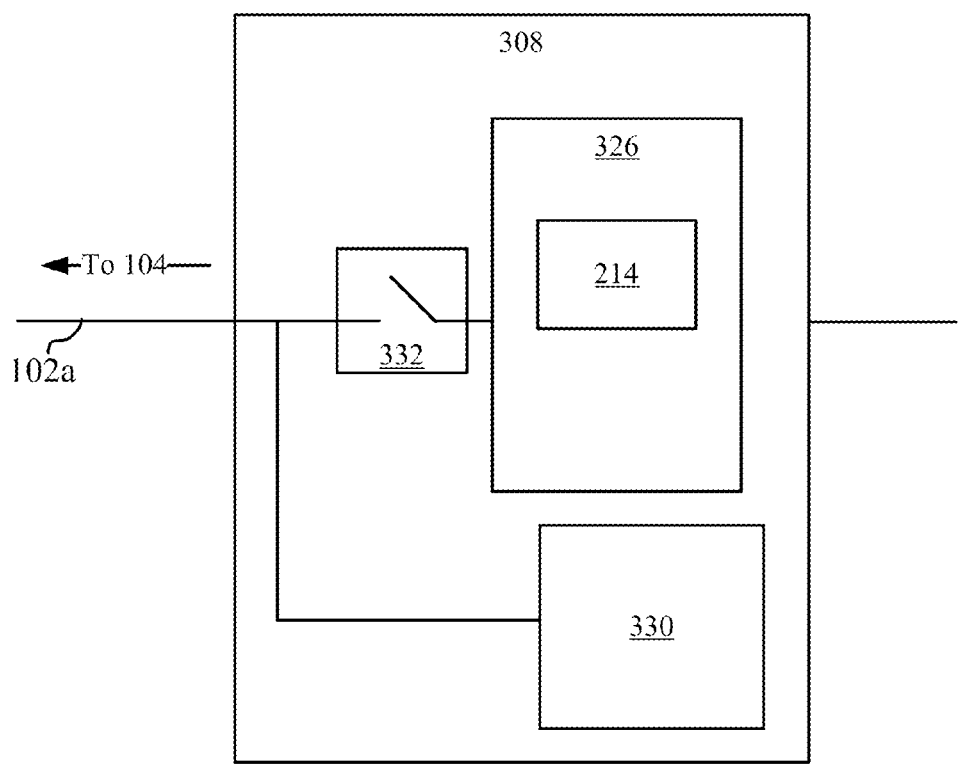
FIG. 4 is a schematic of an input card 308 in accordance with an illustrative embodiment of the present invention.

FIG. 4 is a schematic of an input card 308 in accordance with an illustrative embodiment of the present invention. The input card 308 includes a switch 332 connected in series with an integrated circuit 326. The switch 332 may be, but is not limited to, a mechanical switch, electrically operated switch, solid state relay, latching relay, reed relay, Single Pole Single Throw (SPST) relay, Single Pole Double Throw (SPDT) relay, Double Pole Single Throw (DPST) relay or Double Pole Double Throw (DPDT) relay. The interface cable 102a is connected to the input card 308. Various signals are carried in the interface cable 102a including TMDS, DDC, HPD, and five (5) volts signals. The switch 332 and integrated circuit 326 are in series, which in turn, is in parallel with an Extended Display Identification Data (EDID) memory 330. The input card 308 includes an integrated circuit 326 that includes a security protocol enabled receiver 214. The security protocol may be HDCP. In operation, the input card 308 detects the presence of an event signal 304 from the user interface devices (e.g., 323, 324). In response to the detection of the event signal 304, the switch 332, 532, 632 switches dynamically to a closed position for enabling the at least one source 104 to authenticate with the input card 308, 508, 608, 708 and enabling the output card 310 to authenticate with the at least one sink 106 for security protocol encryption.

In response to the non-detection of the event signal 304, the switch 332, 532, 632 switches dynamically to an open position in order to disable the at least one source 104 from initiating an authentication with the input card 308, 508, 608, 708. Therefore, the output card 310 also does not attempt to initiate an authentication with the at least one sink 106 for security protocol encryption. Since the source 104 does not detect the HDCP capability of the input card 308, 508, 608, 708, authentication never occurs or more specifically an attempt to authenticate never happened, therefore a failed authentication never occurred.

More specifically, when the source 104 fails authentication or changes the resolution of the multimedia data or changes the resolution of the sink 106, the reestablishment and encoding/decoding of the HDCP become unstable, such that the sink 106 cannot display the multimedia data normally. The source 104 uses a hot-plug detect signal of the HDMI interface to identify the coupling state between the sink 106 and the source 104. When the hot-plug detect signal is a logic high level pulse signal, the source 104 and the sink 106 are in a coupled state. In the conventional art, in order to solve the problem that the sink does not function normally, it may be required to disconnect and connect the HDMI connector again or restart the source 104 to enable the source 104 to read the EDID again and reestablish the HDCP.

Continuing on to the operation, typically, the source 104 initially authenticates with the input card 308, 508, 608, 708. Once that authentication is successful, the output card 310 then authenticates with the sink 106. In one embodiment, when the input card 308 does not detect the event signal 304, the switch 332, 532, 632 switches dynamically to an open position in order to disable the source 104 from initiating authentication with the input card 308, 508, 608, 708. As a result, the output card 310 also does not attempt to initiate an authentication with sink 106 for security protocol encryption. The non-copy protected content is still transmitted to the sink/display 106 even though the source 104 and the sink/display 106 are HDCP compliant. Moreover, the end user can copy and/or share the non-copy protected content. Without, in part, the switch 332 and its placement thereof, the non-copy protected content will not be able to be shared and/or recorded when the source 104 and the sink/display 106 are HDCP compliant.

Typically, if an end user wants to switch between watching copy protected content (HDCP required) or watching/recording non-copy protected content such as a PowerPoint in a lecture scenario, the end user installs two different AV distribution switcher infrastructure. One AV switcher supports HDCP and another AV switcher does not support HDCP. When the customer wants to watch copy protected content, the end user physically plugs into the HDCP supported AV switcher and when the end user wants to watch/record lectures, the end user plugs into a different system. The present disclosure allows a single AN switcher system to be used so that the end user does not need to physically change the cable positioning. Moreover, the present disclosure saves resources and complexities because separate systems do not need to be setup.

It should be understood that there may be more than one source 104 and sink/display 106 connected to the system 300. It should also be understood that there may be more than one input card 308a, 308b, 308n (collectively 308) with similar electrical connections and physical layouts.

Figure 5:
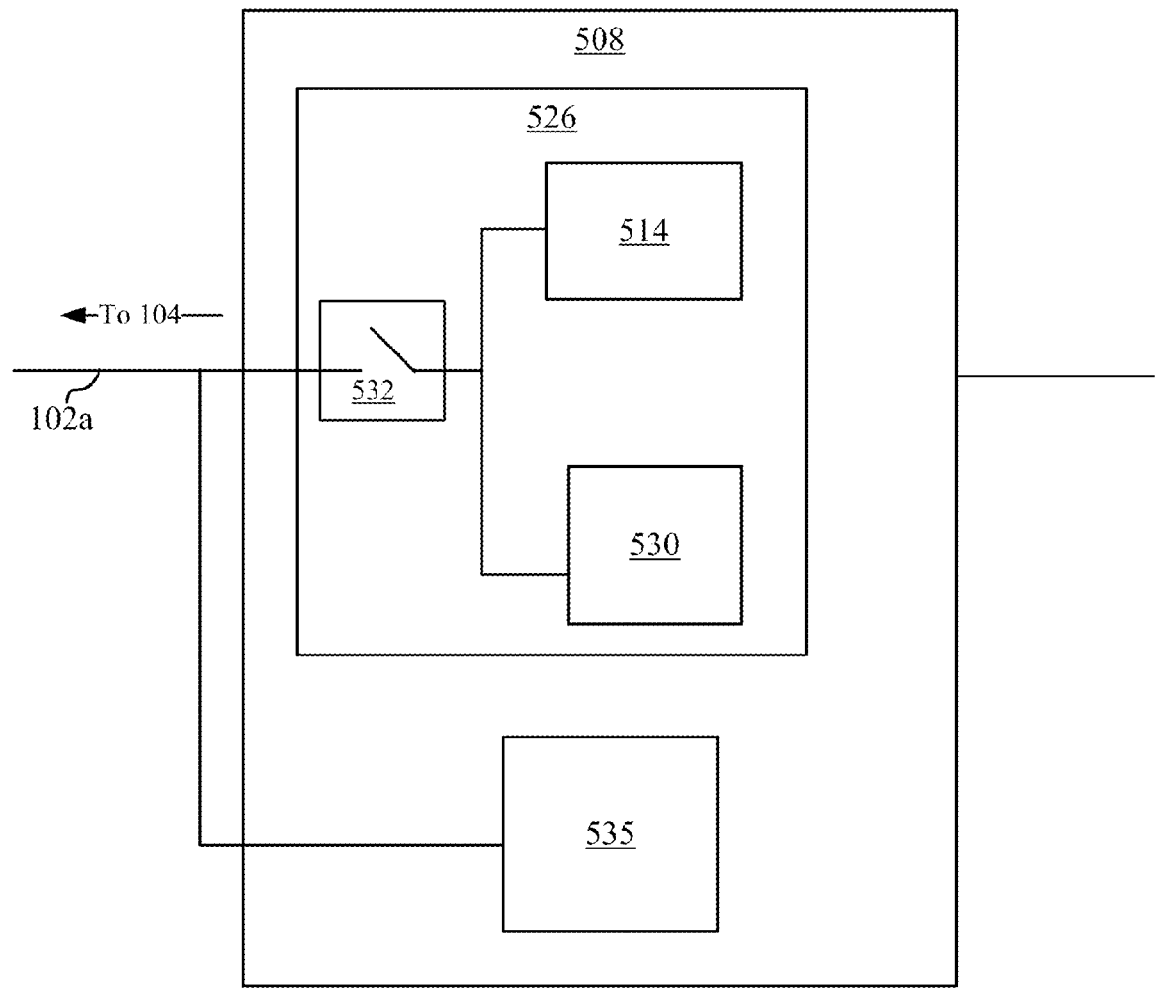
FIG. 5 is a schematic of an input card 508 in accordance with another illustrative embodiment of the present invention.

FIG. 5 is a schematic of an input card 508 in accordance with another illustrative embodiment of the present invention. The input card 508 has the DDC signal in the interface cable 102a into the input card 508. The input card 508 includes an integrated circuit 526. The integrated circuit 526 includes a switch 532, a security protocol enabled receiver 514, and an EDID 530. The EDID 530 and receiver 514 are in parallel with each other. The EDID 530 and receiver 514, in turn, are in series with the switch 532. The switch 532, security protocol enabled receiver 514, and EDID 530 have full integration on the integrated circuit 526. When the input card 508 does not detect the event signal 304 from the user interface device 323, 324, the switch 532 dynamically switches to an open or disconnect position. The non-copy protected content is displayed on the sink/display 106. And the non-copy protected content can be recorded and/or shared even when the sink/display 106 is HDCP compliant. The EDID 535 is connected to the interface cable 102a prior to the cable 102a inputting into the switch 532. In one embodiment, the EDID 535 is connected externally to the integrated circuit 526. The internal EDID 530 is then disabled via software. When the input card 508 detects the event signal 304 from at least one user interface device (323, 324), the switch 532 dynamically switches to a closed or connect position and the non-copy protected content or HDCP content 202 is transmitted to the sink/display 106. Both the non-copy protected content and the HDCP content 202 cannot be recorded and/or shared when the sink/display 106 is HDCP compliant.

Figure 6:
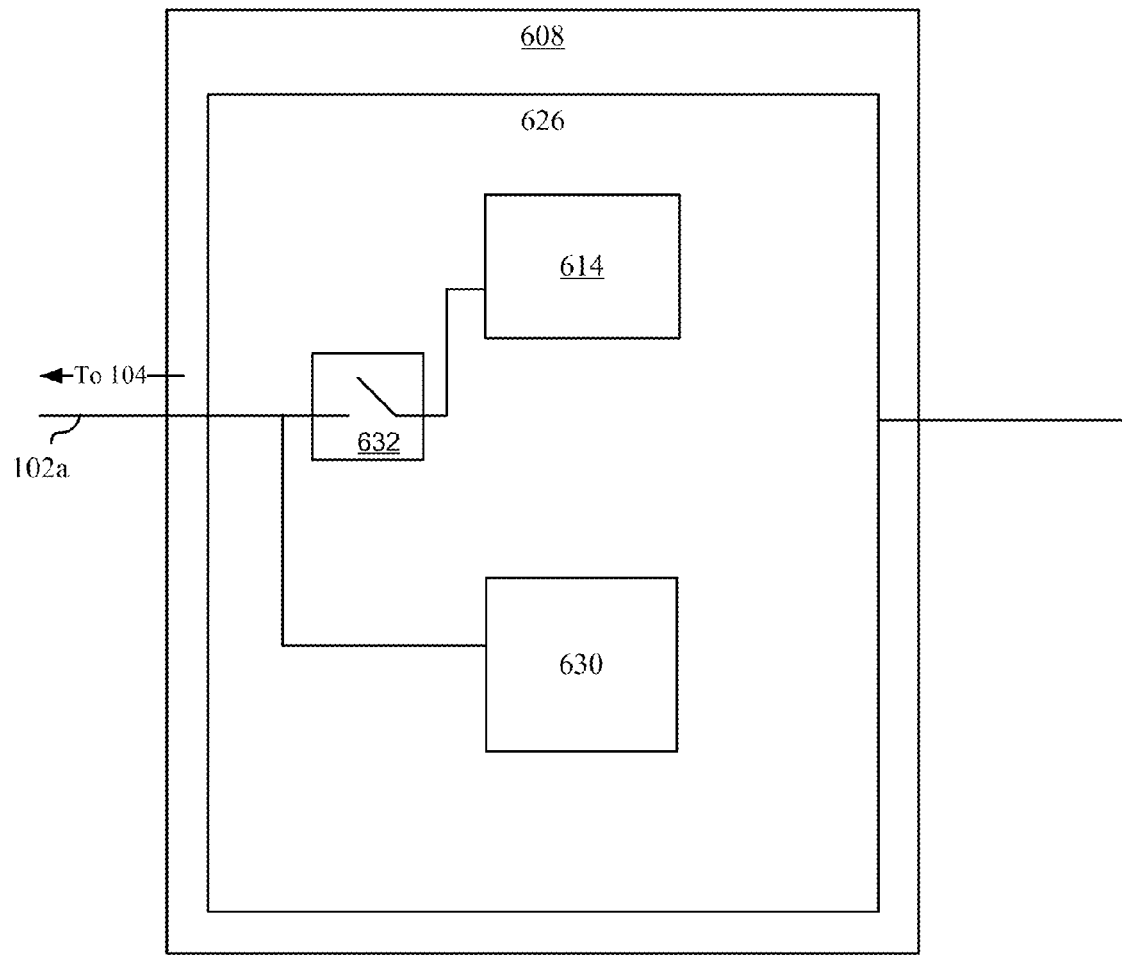
FIG. 6 is a schematic of an input card 608 in accordance with yet another illustrative embodiment of the present invention.

FIG. 6 is a schematic of an input card 608 in accordance with yet another illustrative embodiment of the present invention. The input card 608 is similar to the input card 508 with the exception that there is no external EDID 535 and the connection to the switch 632. Input card 608 has the DDC signal on the interface cable 102a, which connects to the input card 608. The input card 608 includes an integrated circuit 626. The integrated circuit 626 includes a switch 632, a security protocol enabled receiver 614, and an EDID 630. The switch 632 is in series with the receiver 614, which in turn, is in parallel with the EDID 630. The switch 632, security protocol enabled receiver 614, and EDID 630 have full integration on the integrated circuit 626. The EDID 630 is connected to line 102a before it is connected into the input of the switch 632. That way, when the switch 632 is disconnected, non-copy protected content can still be passed to the sink/display 106. Hence, non-copy protected content can be recorded and/or stored even when sink/display 106 is HDCP compliant. As described above, when the input card 608 does not detect the event signal 304, the switch dynamically switches to an open or disconnect position in order to disable the at least one source 104 from being able to detect the HDCP capability of the input card 608. As a result, the output card 310 also does not attempt to authenticate with the sink 106.

Figure 7:
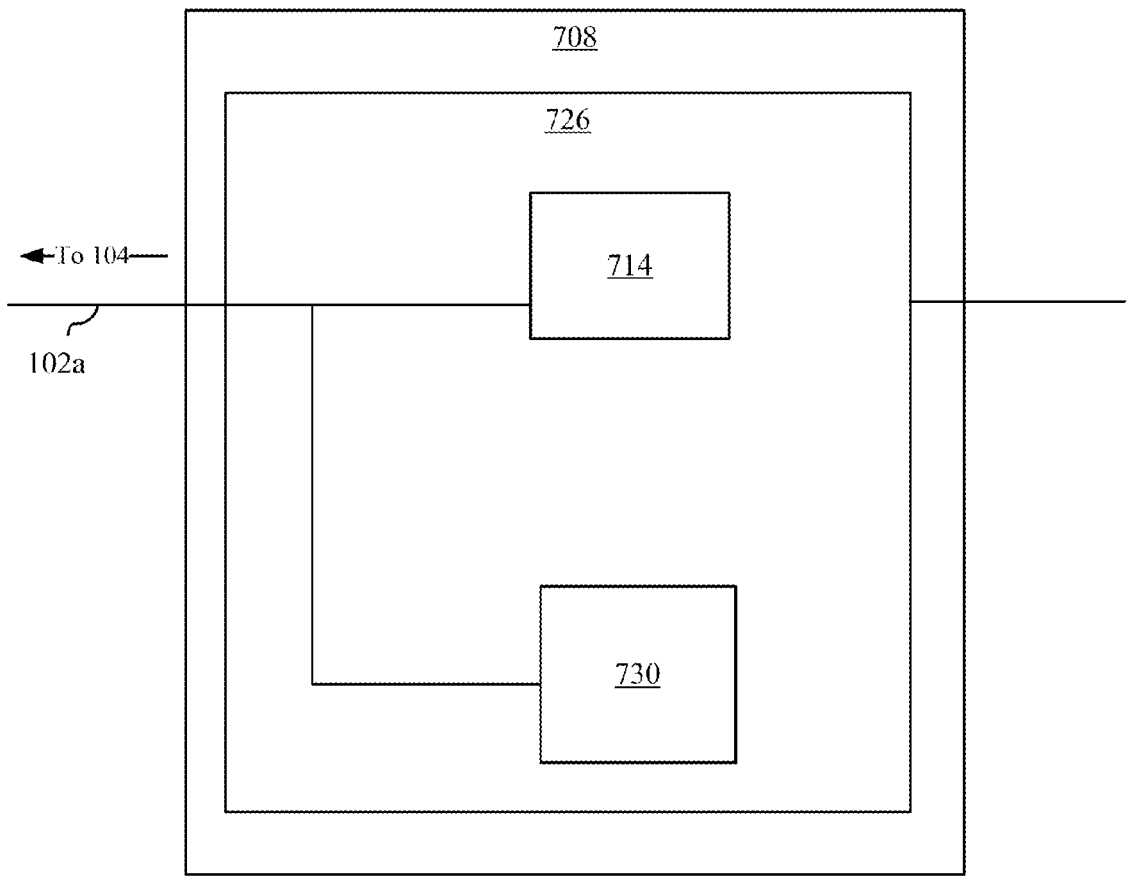
FIG. 7 is a schematic of an input card 708 in accordance with yet another illustrative embodiment of the present invention.

FIG. 7 is a schematic of an input card 708 in accordance with yet another illustrative embodiment of the present invention. This embodiment changes the register of the security protocol enabled receiver 714. According to the HDCP specification, the register or memory location of the receiver 714 is typically 0x70. By using a software program, the register memory location is changed to, for example, 0x60. As a result, the source 104 will not recognize the receiver 714. Since the receiver 714 is not recognized, the authentication process never gets initiated and hence no failure in authentication is possible. Non-copy protected content can still be passed to the sink/display 106 even though the sink/display 106 is HDCP compliant. The non-copy protected content can be recorded and/or shared.

The following is a pseudo-code representation of the operation in accordance with an illustrative embodiment of the present invention.

User sets HDCP enable or disable for a desired sink/display

Drop hot plug to change HDCP switch

Wait until hot plug signal goes away based on measurements such as sync measurements and sync detect.

Perform switch method

Set hardware disconnect switch

Raise hot plug

Figure 8:
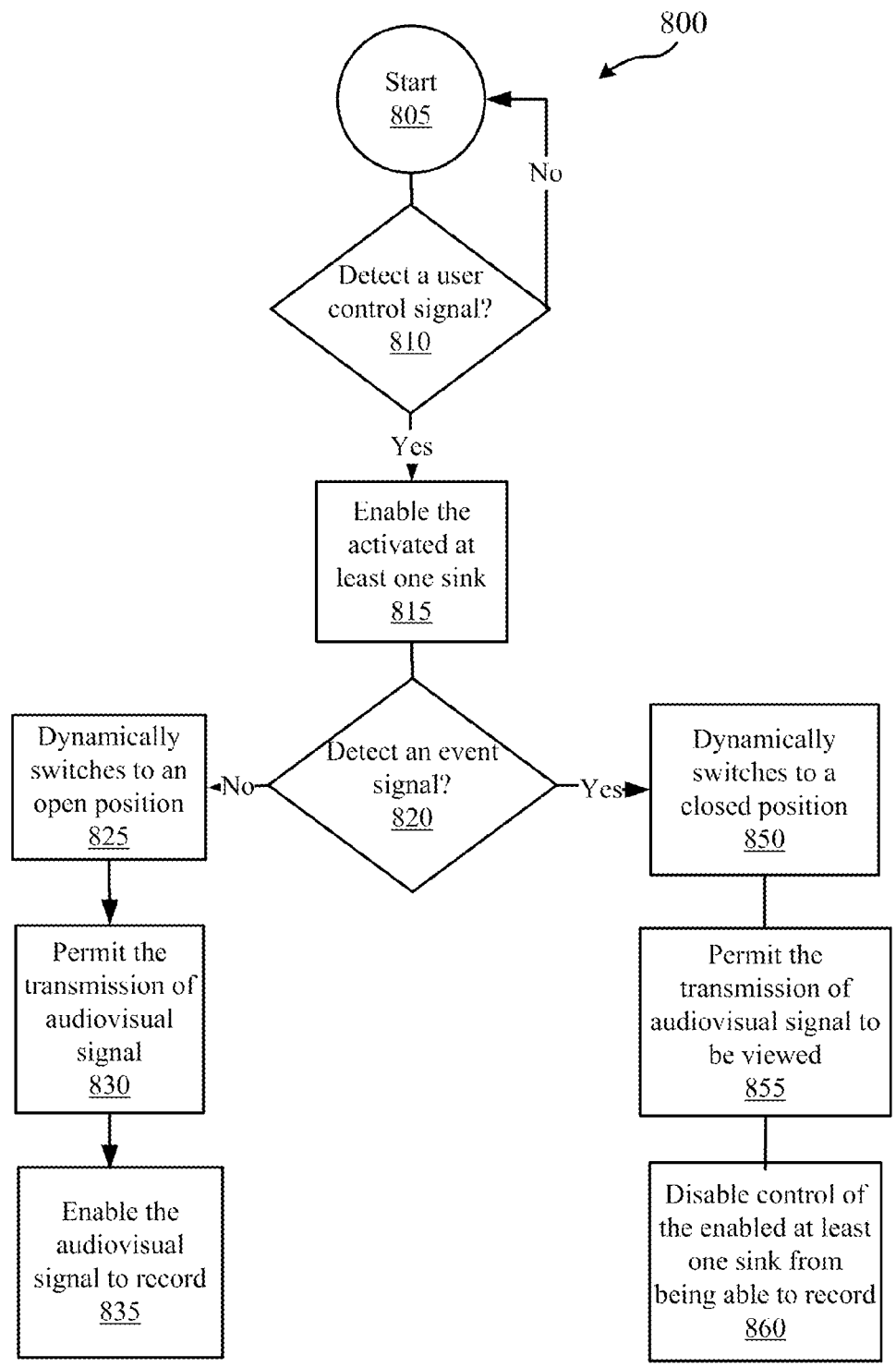
FIG. 8 illustrates a flowchart for enabling/disabling HDCP content protection in accordance with an illustrative embodiment of the present invention.

FIG. 8 illustrates a method 800 for enabling/disabling DDC access to enable/disable HDCP according to an embodiment of the invention. Procedure 800 begins at step 805. In step 810 a system (e.g., 300) or apparatus (e.g., 308, 408, 508, 608, 708) detects a user control signal 316 to activate one of the at least one sinks 106. If the system (e.g., 300) or apparatus (e.g., 308, 408, 508, 608, 708) does not detect the user control signal 316, the procedure goes back to step 805. However, if there is a detection of the user control signal 316, the system (e.g., 300) or apparatus (e.g., 308, 408, 508, 608, 708) activates or enables the at least one sink 106 for receiving and displaying audiovisual signal, which is the HDCP content 202 in step 815.

In step 820, the system (e.g., 300) or apparatus (e.g., 308, 408, 508, 608, 708) detects an event signal 304 from at least one user interface device (323, 324). In response to the detection of the event signal 304, the switch 332 switches dynamically to a closed position for enabling the at least one source 104 to authenticate with the input card 308, 508, 608, 708 and enabling the output card 310 to authenticate with the at least one sink 106 for security protocol encryption in step 850. The system (e.g., 300) or apparatus (e.g., 308, 408, 508, 608, 708) permits the transmission of audiovisual signal or HDCP content 202 from the at least one source 104 to the enabled at least one sink 106 upon successful authentication between the at least one source 104 and the activated at least one sink 106 in step 855. In step 860, the system (e.g., 300) or apparatus (e.g., 308, 408, 508, 608, 708) disables control of the enabled at least one sink 106 from being able to record the audiovisual signal that contains copy protected content (e.g., HDCP content 202) from being able to be recorded and shared.

In response to the system (e.g., 300) or apparatus (e.g., 308, 408, 508, 608, 708) not detecting the event signal 304, the switch 332 switches dynamically to an open position in order to disable the at least one source 104 from initiating an authentication with the input card 308, 508, 608, 708 in step 825. To this end, the output card 310 also does not attempt to initiate an authentication with the at least one sink 106 for security protocol encryption. In step 830, the system (e.g., 300) or apparatus (e.g., 308, 408, 508, 608, 708) permits transmission of the audiovisual signal (e.g., HDCP content 204) to be displayed from the at least one source 104 onto the activated at least one sink 106. In step 835, the system (e.g., 300) or apparatus (e.g., 308, 408, 508, 608, 708) enables control of the enabled at least one sink 106 from being able to record since the audiovisual signal 202 contains non-copy protected content.

Any process descriptions or blocks in flow charts should be understood as representing modules, segments, or portions of code that include one or more executable instructions for implementing specific logical functions or steps in the process. Alternate implementations are included within the scope of the preferred embodiment of the present invention in which functions may be executed out of order from that shown or discussed, including substantial concurrence or reverse order, depending on the functionality involved, as would be understood by those reasonably skilled in the art of the present invention. Also, steps disclosed as separate may be performed concurrently or combined, and a step shown as discrete may be performed as two or more steps. Furthermore, numerical values and disclosures of specific hardware are illustrative rather than limiting. Moreover, while the preferred embodiment has been disclosed in the context of DVI, the invention can be implemented for use with another suitable interface that uses HDCP, such as HDMI or any substantially DVI-like interference. Therefore, the present invention should be construed as limited only by the appended claims.

INDUSTRIAL APPLICABILITY

To solve the aforementioned problems, the present invention is a unique method, apparatus, and system for enabling and/or disabling dynamic Display Identification Data to enable and/or disable High-Bandwidth Digital Content Protection without an authentication process.

LIST OF ACRONYMS USED IN THE DETAILED DESCRIPTION OF THE INVENTION

The following is a list of the acronyms used in the specification in alphabetical order.
API Application Programming Interface
AV Audiovisual
CD ROM Compact Disk Read-Only Memory
CPU Central Processing Unit
CSS Content Scrambling System
DCP Digital Content Protection, LLC.
DDC Digital Display Channel
DDWG Digital Display Working Group
DLI Digital Light Interface
DP DisplayPort
DPDT Double Pole Double Throw relay
DPST Double Pole Single Throw relay
DRM Digital rights management
DVD Digital Versatile Disk
DVI Digital Video Interface
EDID Extended Display Identification Data
GVIF Giga-bit Video Interface
GUI Graphical User Interface
HDCP High-Bandwidth Digital Content Protection
HD-DVD High-Definition Digital Versatile/Video Disc
HDMI High-Definition Multimedia Interface
HP Hot Plug Detect
IP Internet Protocol
KSV Key Selection Vector
RAM Random Access Memory
ROM Read Only Memory
SDK Software Development Kit
SPDT Single Pole Double Throw relay
SPST Single Pole Single Throw relay
SRM System Renewability Message
TCP/IP Transmission Control Protocol/Internet Protocol
TMDS Transition Minimized Differential Signaling
TV Television
UDI Unified Display Interface
USB Universal Serial Bus
WHDI Wireless Home Digital Interface Alternate Embodiments It is to be understood that both the general and detailed descriptions above are exemplary and explanatory only and are not restrictive of the invention. It should be understood that the invention can be implemented in a DVI or HDMI capable set-top box. While the invention has been disclosed for use with HDCP, it can be used with any other security protocol that satisfies the following two attributes. The first attribute is that the security protocol is tied to the video content being transmitted; that is, if the video attributes change, the security protocol must be renegotiated. The second attribute is that the security protocol offers a way to determine or detect whether the remote device is capable of supporting the security protocol.

At least a portion of the input card (e.g., 308, 408, 508, 608, 708) of the present invention may be implemented in an integrated circuit. In forming integrated circuits, a plurality of identical die is typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A system for enabling/disabling Display Data Channel (DDC) access to enable/disable a security protocol, the system comprising:
   at least one source;
   at least one sink; and
   a switcher device communicatively coupled in-between the at least one source and the at least one sink, the switcher device comprises:
      a multiplexer coupled in-between at least one input and output cards and configured to transmit an audiovisual signal from the at least one input card to a first and at least a second output card via a physical connection; wherein the multiplexer is configured to dynamically switch between the first and at least second output card based on a user control signal that activates one of the at least one sinks, wherein each of the output cards is coupled to the at least one sink;
      wherein the input card comprises:
         an integrated circuit that includes High-Bandwidth Digital Content Protection (HDCP) enabled receiver; and
         a switch coupled in-between the HDCP enabled receiver and an Extended Display Identification Data (EDID) memory, wherein the input card is configured to detect the presence of an event signal from at least one user interfaced device,
            wherein in response to the detection of the event signal, the switch is configured to dynamically switch to a closed position in order to enable the at least one source configured to perform a first authentication with the input card and the output card configured to perform a second authentication with the at least one sink for security protocol encryption and the input card is configured to permit the transmission of the audiovisual signal from the at least one source to the at least one sink, and wherein in response to the non-detection of the event signal, the switch is configured to dynamically switch to an open position in order to disable the at least one source from initiating a first authentication with the input card, therefore the output card also does not attempt to initiate a second authentication with the at least one sink for security protocol encryption and the input card is configured to permit the transmission of the audiovisual signal from the at least one source to the at least one sink;

wherein the input card is configured to enable the at least one sink from being able to record since the audiovisual signal includes a non-copy protected content.

2. The system of claim 1, wherein the at least one source and sink are High-Bandwidth Digital Content Protection compliant.

3. The system of claim 1, wherein the at least one physical connection interconnects to the at least one source, the switcher device, and the at least one sink device.

4. The system of claim 1, wherein the physical connection comprises an HDMI cable that carries Transition Minimized Differential Signal (TMDS), Digital Display Channel (DDC), and Hot Plug Detect (HPD) signals.

5. The system of claim 1, wherein the integrated circuit comprises the switch device, HDCP enabled receiver, and EDID memory, wherein the HDCP enabled receiver and EDID memory are in parallel with respect to each other, and wherein the combination of the HDCP enabled receiver and EDID memory are in series with the switch device.

6. The system of claim 5, wherein the integrated circuit is in parallel with another EDID memory.

7. The system of claim 1, wherein the switch device comprises a mechanical switch, electrically operated switch, solid state relay, latching relay, reed relay, Single Pole Single Throw (SPST) relay, Single Pole Double Throw (SPDT) relay, Double Pole Single Throw (DPST) relay, and Double Pole Double Throw (DPDT) relay.

8. The system of claim 1, wherein the switcher device further comprises a processor coupled to a transceiver for bidirectional communication with the at least one user interface device, wherein the processor and transceiver are configured to process and receive the user control signal in response to a user activating the at least one user interface device.

9. The system of claim 8, wherein the at least one user interface device comprises a graphical user interface (GUI) touch panel, mobile device, tablet, and computer.

10. The system of claim 8, wherein the at least one user interface device is configured to transmit the user control signal wired or wirelessly.

11. The system of claim 8, wherein the at least one user interface device further comprises software tools to assist the user in selecting the at least one source.

12. The system of claim 1, wherein the at least one source comprises a game console, digital versatile disc (DVD) player, cable box, desktop computer, laptop, and blu-ray player.

13. The system of claim 1, wherein the least one sink comprises a display device, wherein the display device is a television.

14. The system of claim 1, wherein the input card is configured to disable the at least one sink from being able to record since the audiovisual signal includes copy protected content.

15. The system of claim 1, wherein the input card is configured to permit the transmission of audiovisual signal from the at least one source to the at least one sink.

16. The system of claim 1, wherein the second authentication is attempted if the first authentication is successful between the at least one source and the input card.

17. The system of claim 1, wherein the first and second authentications includes an encryption.

18. A switcher device, comprising:
a multiplexer coupled in-between at least one input and output cards and configured to transmit an audiovisual data signal from the at least one input card to a first and at least a second output card;
wherein the multiplexer is configured to dynamically switch between the first and at least second output card based on a user control signal that activates one of at least one sinks;
wherein each of the output cards is coupled to the at least one sink;
wherein the input card comprises:
an integrated circuit that includes a High-Bandwidth Digital Content Protection (HDCP) enabled receiver; and
a switch coupled in-between the HDCP enabled receiver and an Extended Display identification Data (EDID) memory, wherein the at least one input card is configured to detect the presence of an event signal from the at least one user interface device;
wherein in response to the detection of the event signal, the switch is configured to dynamically switch to a closed position in order to enable the at least one source configured to authenticate with the input card and the output card configured to authenticate with the at least one sink for security protocol encryption and the input card is configured to permit the transmission of the audiovisual signal from the at least one source to the at least one sink, and
wherein in response to the non-detection of the event signal, the switch is configured to dynamically switch to an open position in order to disable the at least one source from initiating an authentication with the input card, therefore the output card also does not attempt to initiate an authentication with the at least one sink for security protocol encryption and the input card is configured to permit the transmission of the audiovisual signal from the at least one source to the at least one sink;
wherein the input card is configured to enable the at least one sink from being able to record since the audiovisual signal includes non-copy protected content.

19. The switcher device of claim 18, wherein the integrated circuit comprises the switch device, HDCP enabled receiver, and EDID memory, wherein the HDCP enabled receiver and EDID memory are in parallel with respect to each other, and wherein the combination of the HDCP enabled receiver and EDID memory are in series with the switch device.

20. The switcher device of claim 19, wherein the integrated circuit is in parallel with another EDID memory.

21. The switcher device of claim 18, wherein the switch device comprises a mechanical switch, electrically operated switch, solid state relay, latching relay, reed relay, Single Pole Single Throw (SPST) relay, Single Pole Double Throw (SPDT) relay, Double Pole Single Throw (DPST) relay, and Double Pole Double Throw (DPDT) relay.

22. The switcher device of claim 18, further comprises a processor coupled to a transceiver for bidirectional communication with the at least one user interface device, wherein the processor and transceiver are configured to process and receive the user control signal in response to a user activating the user activating the at least one user interface device.

23. The switcher device of claim 18, wherein the at least one user interface device comprises at least one graphical user interface (GUI) touch panel, mobile device, tablet, and computer.

24. The switcher device of claim 18, wherein the at least one user interface device is configured to transmit the user control signal wired or wirelessly.

25. The switcher device of claim 18, wherein the at least one user interface device further comprises software tools to assist the user in selecting the at least one source.

26. The switcher device of claim 18, wherein the least one source comprises a game console, digital versatile disc (DVD) player, cable box, desktop computer, laptop, and blu-ray player.

27. The switcher device of claim 18, wherein the least one sink comprises a display device, wherein the display device is a television.

28. A method for enabling/disabling Display Data Channel (DDC) access to enable/disable High-Bandwidth Digital Content Protection source, the method comprising:
  providing at least one source;
  providing at least one sink;
  coupling a switcher device communicatively in-between the at least one source and the at least one sink;
  coupling a multiplexer in-between at least one input and output cards for transmitting an audiovisual signal from the at least one input card to a first and at least a second output card via physical connection; wherein the input card includes High-Bandwidth Content Protection (HDCP) enabled receiver;
  detecting, using an input card, a user control signal to activate one of at least one sinks;
  in response to the detection of the user control signal, enabling the selected at least one sink for receiving audiovisual signal;
  detecting an event signal;
  wherein in response to the detection of the event signal, switching the switcher device dynamically to a closed position for enabling the at least one source to authenticate with the input card and enabling the output card to authenticate with the at least one sink for security protocol encryption;
    permitting the transmission of audiovisual signal from the at least one source to the enabled at least one sink upon successful authentication; and
    disabling control of the enabled at least one sink from being able to record since the audiovisual signal contains copy protected content;
  wherein in response to the non-detection of the event signal, switching the switcher device dynamically to an open position in order to disable the at least one source from initiating an authentication with the input card, therefore the output card also does not attempt to initiate an authentication with the at least one sink for security protocol encryption;
    permitting the transmission of the audiovisual signal to be displayed from the at least one source to the enabled at least one sink; and
    enabling control of the enabled at least one sink from being able to record since the audiovisual signal contains non-copy protected content.

29. The method of claim 28, wherein the event signal is a signal that includes activating a particular mode of the at least one source, wherein the mode includes playing a blu-ray DVD, displaying a PowerPoint presentation, displaying a website, collaborating on a white board application, using a document camera, and streaming content from a media player.

30. The method of claim 29, wherein the mode is associated with the audiovisual signal containing either copy protected content or non-copy protected content.

31. The method of claim 28, wherein detecting the user control signal wired or wirelessly.

32. The method of claim 28, wherein in response to detecting the event signal, changing an address of the HDCP enabled receiver to another address so that the at least one source does not detect the HDCP compatibility of the input card.

33. An integrated circuit, comprising:
  an enabled High-Bandwidth Digital Content Protection (HDCP) receiver;
  an Extended Display Identification Data (EDID) memory; and
  a switch coupled in-between the security protocol enabled receiver and the EDID memory, wherein the integrated circuit is configured to detect the presence of an event signal from at least one user interface device,
    wherein in response to the detection of the event signal, the switch is configured to dynamically switch to a closed position in order to enable the at least one source configured to authenticate with an input card and an output card configured to authenticate with the at least one sink for security protocol encryption and the input card is configured to permit the transmission of the audiovisual signal from the at least one source to the at least one sink, and
    wherein in response to the non-detection of the event signal, the switch is configured to dynamically switch to an open position in order to disable the at least one source from initiating an authentication with the input card, therefore the output card also does not attempt to initiate an authentication with the at least one sink for security protocol encryption and the input card is configured to permit the transmission of the audiovisual signal from the at least one source to the at least one sink;
  wherein the input card is configured to enable the at least one sink from being able to record since the audiovisual signal includes non-copy protected content.

34. A computer program product for enabling and disabling a security protocol, the computer program product comprising: a non-transitory computer readable storage medium having computer readable program code embodied therewith, the computer readable program code comprising: computer readable program code configured to:
  provide at least one source;
  provide at least one sink;
  couple a switcher device communicatively in-between the at least one source and the at least one sink;
  couple a multiplexer in-between at least one input and output cards for transmitting an audiovisual signal from the at least one input card to a first and at least a second output card via physical connection;

detect, using an input card, a user control signal to activate one of at least one sinks; wherein the input card includes High-Bandwidth Content Protection (HDCP) enabled receiver;

in response to the detection of the user control signal, enabling the selected at least one sink for receiving audiovisual signal;

detect an event signal;

wherein in response to the detection of the event signal, switching the switcher device dynamically to a closed position for enabling the at least one source to authenticate with the input card and enabling the output card to authenticate with the at least one sink for security protocol encryption;

permit the transmission of audiovisual signal from the at least one source to the enabled at least one sink upon successful authentication; and disable control of the enabled at least one sink from being able to be recorded since the audiovisual signal contains copy protected content;

wherein in response to the non-detection of the event signal, switch the switcher device dynamically to an open position in order to disable the at least one source from initiating an authentication with the input card, therefore the output card also does not attempt to initiate an authentication with the at least one sink for security protocol encryption;

permit the transmission of the audiovisual signal to be displayed from the at least one source to the enabled at least one sink; and enable control of the enabled at least one sink from being able to record since the audiovisual signal contains non-copy protected content.

35. The computer program product of claim 34, wherein detecting the user control signal wired or wirelessly.

36. The computer program product of claim 34, further comprising in response to detecting the event signal, changing an address of the HDCP enabled receiver to another address so that the at least one source does not detect the HDCP compatibility of the input card.

* * * * *